United States Patent [19]
Kametani

[11] Patent Number: 5,361,369
[45] Date of Patent: Nov. 1, 1994

[54] SYNCHRONOUS METHOD OF, AND APPARATUS FOR, ALLOWING A PROCESSOR TO PROCESS A NEXT TASK BEFORE SYNCHRONIZATION BETWEEN A PREDETERMINED GROUP OF PROCESSORS

[75] Inventor: Masatsugu Kametani, Tsuchiura, Japan

[73] Assignee: Hitachi, Ltd., Tokyo, Japan

[21] Appl. No.: 759,529

[22] Filed: Sep. 13, 1991

[30] Foreign Application Priority Data

Sep. 14, 1990 [JP] Japan .................................. 2-245208

[51] Int. Cl.$^5$ ............................................. G06F 9/00
[52] U.S. Cl. .................................... 395/800; 364/271;
364/281.4; 364/281.7; 364/DIG. 1; 395/650;
395/375
[58] Field of Search ...................... 395/800, 650, 375;
364/133

[56] References Cited

U.S. PATENT DOCUMENTS

| | | | |
|---|---|---|---|
| 4,344,134 | 8/1982 | Barnes | 395/800 |
| 4,493,053 | 1/1985 | Thompson | 395/250 |
| 4,925,311 | 5/1990 | Neches | 395/650 |
| 5,197,137 | 3/1993 | Kumar | 395/375 |

OTHER PUBLICATIONS

IBM Tech Discl. Bul. vol. 31. No. 11. Apr. 1989 pp. 382–389. "Low–Cost Device for Contention Free Barrier Synchronization".

Primary Examiner—Eric Coleman
Attorney, Agent, or Firm—Antonelli, Terry, Stout & Kraus

[57] ABSTRACT

When a plurality of processors share a plurality of tasks and parallelly process the shared tasks, each of these processors outputs bit information for designating a processor in a group to which the processor belongs, when a currently executed task processing has been terminated, and the bit information is stored in a synchronous register disposed in each of the processors. When it is detected that all of processors in the same group have terminated task processings, each of these processors in the same group are supplied with a synchronization termination signal from the synchronous registers related thereto. Before all of the task processings have been terminated in the same group, any processors in the same group which have already terminated their task processings progress the execution of the next tasks until they access for the first time a data sharing circuit for holding data shared among the processors.

6 Claims, 9 Drawing Sheets

| COMMAND | OPERATION MNEMONIC | FUNCTION |
|---|---|---|
| SYNC 0 | GSEOW | GROUP SET → END OUT ⇄ WAIT |
| SYNC 1 | GSEO | GROUP SET → END OUT |
| SYNC 2 | GS | GROUP SET |
| SYNC 3 | EO | END OUT |
| SYNC 4 | EOW | END OUT → WAIT |
| SYNC 5 | TSEOW | SIMULTANEOUS GROUP SET (TOTAL SETTING) → END OUT ⇄ WAIT |
| SYNC 6 | TSEO | SIMULTANEOUS GROUP SET (TOTAL SETTING) → END OUT |
| SYNC 7 | W | WAIT (SYNCHRONIZATION CHECK) |

SYNCHRONOUS METHOD OF, AND APPARATUS FOR, ALLOWING A PROCESSOR TO PROCESS A NEXT TASK BEFORE SYNCHRONIZATION BETWEEN A PREDETERMINED GROUP OF PROCESSORS

CROSS REFERENCE TO RELATED APPLICATION

This invention is related to U.S. patent application Ser. No. 07/084,804 now U.S. Pat. No. 5,107,420 by the same inventor filed Aug. 13, 1987 entitled "SYNCHRONOUS APPARATUS FOR PROCESSORS" assigned to the same assignee, which is hereby incorporated by reference.

BACKGROUND OF THE INVENTION

This invention relates to a multi-processor system, and more particularly, to a synchronous apparatus for processors suitable for use in establishing synchronization of processors with one another.

A conventional synchronous processing in a multi-processor system basically refers to synchronization among tasks (putting in order processing of the tasks), wherein the tasks are started and processed in a task driven or data driven manner. Implementation of such a configuration on a general-purpose multi-processor system employs a method of providing a task termination flag on a shared memory with which each of tasks examines whether or not a necessary preceding task processing has been completed and progresses a task processing in data flow manner, and a token control method. Such a conventional synchronous processing is described in "Multi-microprocessor System", Keigaku Shuppan, November, 1984, pp. 117 to 119. Also, a conventional multi-processor system is disclosed in U.S. Pat. No. 4,493,053.

The above-mentioned prior art related to a general-purpose multi-processor system, since a processing is mainly executed by software and many check items are included, implies large synchronous processing overhead caused by synchronization among tasks (keeping the processing order of tasks correctly without contradiction) or synchronization among processors. Therefore, the tasks cannot be sufficiently fractionized (fine task division). The prior art also implies a problem in that the task processing order for a parallel processing is excessively restricted because the hardware for communications among processors is restricted in general, whereby advantages of the parallel processing cannot be sufficiently obtained, so that it is difficult to achieve a highly efficient parallel processing.

Further, in a conventional multi-processor system which is provided with a limited number of processors for processing multiple tasks, when one of the processors has completed a task processing and is going to progress to the next task processing, a synchronous processing is required for confirming that other necessary task processings have been completed and necessary results have been provided. In this event, the one processor is occupied by the synchronization check processing with software method, so that an empty processing time is produced where the one processor is substantially prevented from executing effective processing until the synchronization check processing has been completed.

SUMMARY OF THE INVENTION

It is an object of the invention to provide a synchronous method and apparatus for processors which is capable of reducing an empty processing time, produced in a queuing processing among processors during a synchronous processing, which is inherent to a parallel processing approach executed by a general-purpose multi-processor system.

To achieve the above object, preferably, a synchronous register having the same number of bits as a limited number of processors is associated with each of the processors for highly efficiently executing a parallel processing without contradiction while establishing synchronization of the processors with one another. A processor, when having terminated a task, stores in the synchronous registers of processors related to the processor, as task termination information, a bit sequence (data word) having bits corresponding to respective processors executing a plurality of tasks related to the task set to an active state. As the result, a task termination processing is executed for making a task termination line active by hardware. This operation is performed independently by all of the processors which are executing related tasks. A determination means monitors each synchronous register related to each processor and determines whether or not all of processors corresponding to respective set bits of each synchronous register have terminated respective task termination processings by comparing the bits with task termination lines corresponding to the respective processors. If the determination results show that all of the related bits are true (tasks have been termiated) in each of the synchronous registers, it is regarded that synchronization has been established among the processors, and accordingly synchronization termination information is issued. A synchronous processing circuit (which is a hardware version of a synchronous processing for a limited number of processors without damaging the general-purpose features) is thus provided.

Also preferably, a data sharing circuit and a local synchronization circuit, as will be explained hereinbelow, are provided in addition to the above-mentioned synchronous processing circuit in order to automatically reduce an empty processing time (inoperative processing time) of processors produced during a synchronous processing period for a parallel processing without causing overhead.

The data sharing circuit holds or provides necessary common data which should be shared by the processors for executing task processings and is accessible from each of the processors.

The local synchronization circuit unconditionally proceeds a processor which has outputted the task termination information to the synchronous processing circuit and terminated a task to the next task. When the processor is to first obtain necessary shared data from the data sharing circuit, if the synchronization termination information has not been issued from the synchronous processing circuit, the local synchronization circuit prohibits the processor from accessing to the data sharing circuit and keeps the processor waiting.

When a task processing has been terminated but a synchronous processing is still being executed, the processor can progress to the next task processing as much as possible until shared data is needed in the next task, so that an empty processing time can be reduced. Such is different from the prior art where the processor is unconditionally kept waiting to cause an empty processing time.

Further, if setting of values to the synchronous register only is performed by software provided for each processor and other synchronous processing is executed by hardware, it is possible to programably establish synchronization among processors with a minimum software overhead of approximately one machine instruction.

The above-mentioned means for reducing an empty processing time produced during a synchronous processing is also effective in reducing the critical path of the parallel processing itself, thereby making it possible to automatically execute a highly efficient parallel processing.

DESCRIPTION OF THE PREFERRED EMBODIMENTS

The whole arrangement of an embodiment of the present invention will hereinbelow be described with reference to FIGS. 1-3.

A synchronous apparatus of the present invention comprises a synchronous processing circuit 101 for performing a synchronous processing among processors necessary for a parallel processing, a plurality of processing units 100n (n=0, 1, 2, . . . ) for executing shared tasks assigned thereto, and a data sharing circuit CSYS 102 on a system bus 120 for providing and holding necessary common data required to communicate necessary data among processors 1n (n=0, 1, 2, . . . ) disposed in the respective processing units 100n or local data sharing circuits CSYS 51n (n=0, 1, 2, . . . ) disposed in the respective processing units 100n for maintaining the coherency of data.

The synchronous processing circuit 101 receives synchronization requests Sln (n=0, 1, 2, . . . ) from the processors 1n in the processing units at corresponding input terminals SYNCnREQ, regards that all the processors are synchronized with one another when all of predetermined synchronization requests Sln become active, and sets synchronization check signals TESTn to the active state for announcing the completion of synchronization to concerned processors. The active synchronization check signals TESTn are supplied through respective TEST signal lines Tln to respective TEST input terminals of signal control circuits 50n disposed in the processing units 100n and those of the processors 1n.

Each of the processors in examines the state of the TEST input terminal by hardware or software and determines whether or not synchronization has been established among processors which are to execute related processings. A basic function of the synchronous processing circuit 101 is composed of returning the TESTn output to an inactive state when the synchronous processing circuit 101 receives the synchronization request Sln from the processor 1n and again setting the TESTn output to the active state when all of the synchronization requests SAn from processors which are to be synchronized with one another become active.

A specific embodiment of the synchronous processing circuit 101 will be later explained in more detail with reference to FIGS. 3 and 4. In the present embodiment, the above-mentioned TESTn output operation is carried out by a single flip-flop 7 for each of the processors 1n. Each of the processors in (n=0, 1, 2, . . . ) supplies an active synchronization request Sln as task termination information when a task processing has been terminated. The processor which has outputted the active synchronization request Sln should remain fundamentally in a waiting state until the related TESTn output becomes active because necessary data used for the next task processing has not been completely provided on the data sharing circuits 102 and 51n (n=0, 1, 2, . . . ). However, if the following conditions are satisfied, the respective processors can parallelly perform processings at the next level to some extent without contradiction in synchronism with one another.

1) At a timing after the task termination information signals (the synchronization request Sln or information supplied to an SYNCnREQ terminal of the synchronous processing circuit) from the processors executing related task processings have all been set to the active state (all the necessary task processings have been terminated at a given level), active synchronization termination information (information delivered from the TESTn terminal and transmitted to the processing unit through the TEST signal line Tln) is supplied to each of processing units and processors which have issued the task termination information. It is supposed that all information on the results of the task processing executed at the level has not been provided until the synchronization termination information becomes active.

2) At the time when a processor has processed to a task processing at the next level (a task processing which should be executed at the next level) and accesses for first time the data sharing circuit 102 or 51n holding data, included in the results of the task processing executed by other processors which should be commonly used by the processors, the processor must have confirmed that the synchronization termination information had already become active. If the synchronization termination information is still in the inactive state at the time the data sharing circuit is to be accessed for first time in a task processing, the access to the data sharing circuit must be prohibited until the synchronization termination information becomes active.

3) Assume now that a border between levels (task processing levels) is defined to be the time at which each of the processors issues the active task termination information. Stated another way, the end of each processing defined as a task is referred to as the level border. Assume also that the time at which an active synchronization termination information is issued from the synchronous processing circuit 101 is defined to be the border of the synchronization level.

By executing a parallel processing in the most efficient manner, in addition to satisfying the above conditions, it is possible to reduce to a minimum an empty processing time (idle time produced by the fact that a processor which has reached a synchronization point at an earlier time is kept waiting until a synchronous processing is completed) produced during a synchronous processing. In other words, a system is employed where the respective processors are adapted to progress, as soon as possible, processings which are to be executed at the next level. Specifically, in a task processing the synchronization termination information is disregarded to thereby progress the task processing until the data sharing circuit is accessed for the first time, and then it is first confirmed whether or not the synchronization termination information is in the active state (other processors have terminated necessary task processings, and all necessary common data exists in the data sharing circuit) at the time of the first access to the data sharing circuit. In other words, each processor forwardly progresses its processing as far as possible by delaying a synchronization point thereof as much as possible.

The above-mentioned system can produce effects of dynamically changing a processing time required for executing each of tasks, which seem to be uniformly divided and generated, in accordance with the synchronization conditions, reducing the critical path of a parallel processing, and automatically achieving a highly efficient parallel processing nearly same as a data flow processing (data driven parallel processing). This system, which is different from conventional one which depends only on information on synchronous processing termination, executes a synchronous processing closely in association with an access processing for the data sharing circuit 102 or 51$n$. The hardware of this system will be next explained, taking as examples the processing unit 100$n$ shown in FIG. 1 and the signal control circuit 50$n$ in the processing unit shown in detail in FIG. 2.

The signal control circuit 50$n$ in each of the processing units 100$n$ receives a control signal 19$n$ including an address signal from the processor 1$n$, decodes the same to generate an access request signal 13$n$ for accessing the sharing system CSYS 51$n$ and the data sharing Circuit bus 112, and supplies the access request signal 13$n$ to an arbitration circuit DC103 for determining which of the processors is given an access right for accessing the data sharing circuit and the data sharing circuit bus 120. The arbitration circuit 103, upon receiving a plurality of the access request signals 13$n$ (n=1, 2, ...) delivered from a plurality of the processing units, selects one from among the processing units, and sets an access permission signal 14$n$ (n=0, 1, 2, ...) corresponding to the selected processing unit to the active state. The signal control circuit 50$n$, when the access permission signal 14$n$ becomes active, turns on an output buffer 52$n$ and outputs an address signal, a control signal, and an information signal, for a write operation, through a bus line 15$n$ to the data sharing circuit bus 120. On the other hand, for a read operation, data on the data sharing circuit bus 120 is written into the local data sharing circuit CSYS 51$n$ through the bus line 15$n$ and an input buffer 53$n$, or the processor In directly reads such data through a bus line 110$n$. When the processor in reads information stored in the local data sharing circuit CSYS 51$n$, a bus line 17$n$ is interposed therebetween. The respective local data sharing circuits CSYS 51$n$ (n=0, 1, 2, ...) in the processing units 100$n$ must usually have the same contents as one another. Therefore, each processor 1$n$, for a read operation, can access the local data sharing circuit CSYS 51$n$ just as a local memory independently of the other processors, whereas, a write operation must be executed by arbitrating the data sharing circuit bus 120 under the management of the arbitration circuit 103 because identical data should be written into the local data sharing circuits CSYS 51$n$ (n=0, 1, 2, ...) in all the processing units 100$n$ (n=0, 1, 2, ...) through the data sharing circuit bus 120. In this event, an access contention may occur with an independently executed read operation from the local data sharing circuit CSYS 51$n$. Such a contention is also controlled by the signal control circuit 50$n$ so as to allow an access to the local data sharing circuits without problem.

Figure 2:
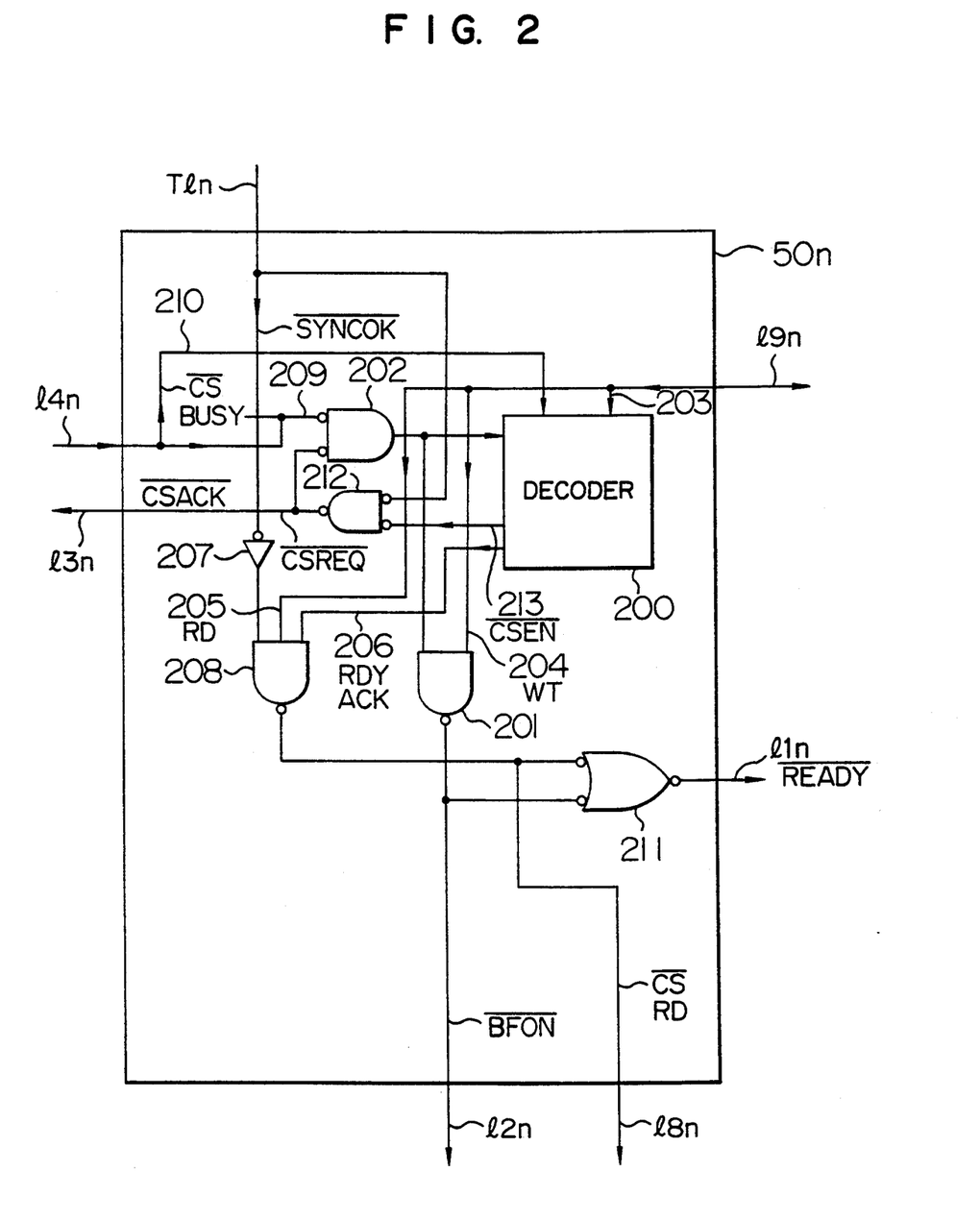
FIG. 2 is a schematic circuit diagram illustrating the configuration of a signal control circuit shown in FIG. 1.

FIG. 2 illustrates an embodiment of the signal control circuit or local synchronization circuit 50$n$. A decoder 200 decodes the control signal including an address signal 19$n$ supplied from the processor 1$n$, and generates a control signal, an enable signal and so on required for an access request generated by the processor in to access the data sharing circuits CSYS 51$n$ and 102. A data sharing circuit bus access request signal $\overline{CSREQ}$ (active at "LOW" level) 13$n$ supplied to the arbitration circuit 103 is generated by performing a logical OR operation of a data sharing circuit enable signal $\overline{CSEN}$ (active at "LOW" level) 213 from the decoder 200 and a synchronization termination information signal $\overline{SYNCOK}$ (active at "LOW" level) T1n from the synchronous processing circuit 101. An acknowledge signal 14$n$ from the arbitration circuit 103 is composed of a $\overline{CSACK}$ signal (an access request is accepted when this signal is at "LOW" level) 209 which is a direct response from the arbitration circuit 103 which has received the $\overline{CSREQ}$ signal 13$n$ and a $\overline{CSBUS}$ signal (active at "LOW" level) indicating that the sharing system CSYS 51$n$ (n=0, 1, 2, ...) is arbitrated by any one of the processing units. An RDYACK signal (active at "HIGH" level) 206 is controlled to be inactive or at "LOW" level when the CSBUSY signal 210 is active, thereby preventing an access contention with a write operation executed by one of the other processing units to the data sharing circuit CSYS 51$n$ thereof when the processor 1$n$ is to read data from the same. More specifically, when a write operation is being performed for the data sharing circuit CSYS 51$n$, a NAND gate 208 becomes inactive (at "HIGH" level), and a read enable signal $\overline{CSRD}$ (active at "LOW" level) is set to be inactive. For example, suppose that the decoder 200 makes the $\overline{CSEN}$ signal 213 active for accessing the data sharing circuit 102. If an $\overline{SYNCOK}$ signal T1n is inactive at this time, the $\overline{CSREQ}$ signal 13$n$ will not become active by the action of an OR gate 212 as long as the $\overline{SYNCOK}$ signal T1n remains inactive, whereby the $\overline{CSACK}$ signal 209 also remains inactive. A NOR gate 202 receiving the $\overline{CSACK}$ signal 209 and the $\overline{CSREQ}$ signal 13$n$ is thereby maintained at "LOW" level. The decoder 200 holds the $\overline{\text{CSEN}}$ signal 213 at "LOW" level until the output from the NOR gate 202 becomes a "HIGH" level. Similarly, a $\overline{\text{BFON}}$ signal 12n for controlling the output from the output buffer 52n, which also receives the output from the NOR gate 202, remains inactive (at "HIGH" level), whereby an access to the data sharing circuit bus 120 is kept waiting until the $\overline{\text{SYNCOK}}$ signal Tln becomes active. A function for temporally automatical stopping an access of the processor 1n to CSYS 102 or 51n by hardware is achieved by maintaining inactive a $\overline{\text{READY}}$ signal (active at "LOW" level) 11n inputted to a $\overline{\text{READY}}$ terminal of the processor 1n to thereby prevent a bus cycle of the processor 1n from being terminated.

The $\overline{\text{READY}}$ signal 11n becomes active by the action of an AND gate 211 when either of the $\overline{\text{CSRD}}$ signal 18n or the $\overline{\text{BFON}}$ signal 12n becomes active, whereby the processor proceeds to the next operation. This operation is referred to as a local synchronization function. Similarly, the $\overline{\text{CSRD}}$ signal 18n is provided for accessing the supply system CSYS 51n. The $\overline{\text{SYNCOK}}$ signal Tln is inverted by an invertor 207 so as to be active at a "HIGH" level and then inputted to the NAND gate 208. Therefore, as long as the $\overline{\text{SYNCOK}}$ signal Tln remains in the inactive state, an access to the data sharing circuit CSYS 51n is temporally stopped by making the $\overline{\text{CSRD}}$ signal 18n and the $\overline{\text{READY}}$ signal 11n inactive.

Figure 3:
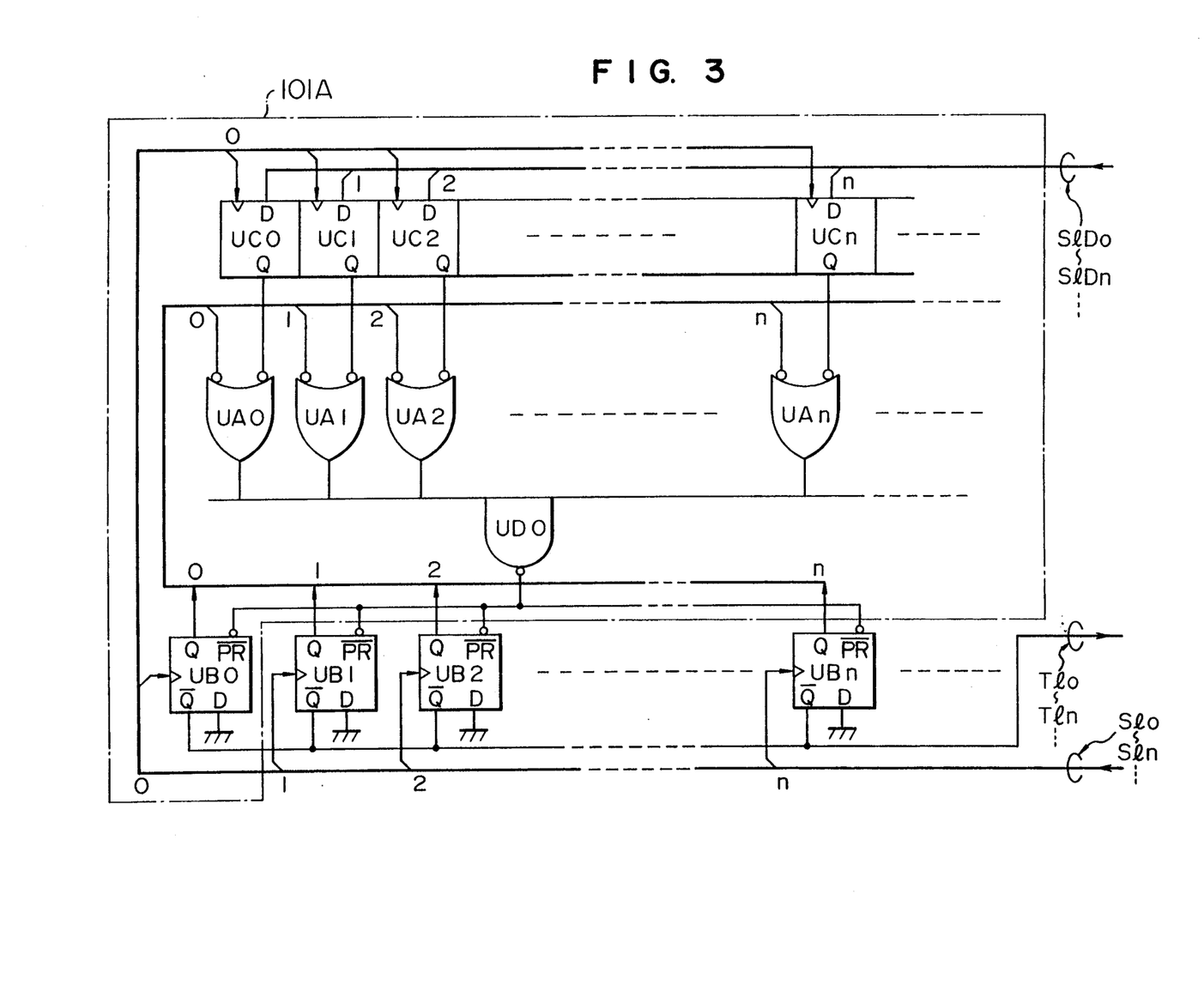
FIG. 3 is a schematic circuit diagram illustrating an embodiment of a synchronous processing circuit shown in FIG. 1.

FIG. 3 illustrates a circuit portion 101A constituting a processor $1_0$ in the synchronization processing circuit 101. Each of NAND gates $UA_0$–$UAn$ . . . receives a Q output of a corresponding one of flip-flops $UC_0$–$UCn$ . . . and a Q output of corresponding one of flip-flops $UB_0$–$UBn$. When the outputs of all of the NAND gates $UA_0$–$UAn$ become "HIGH" level, a multiple input NAND gate $UD_0$ receiving these outputs delivers an output at a "LOW" level. When the Q outputs of the respective flip-flops $UC_0$–$UCn$ . . . are at a "HIGH" level, the Q outputs of the flip-flops $UB_0$–$UBn$ inputted to the corresponding NAND gates $UC_0$–$UCn$ . . . become valid or are inverted and appear at output terminals of the $UC_0$–$UCn$ . . . In this embodiment, the determination as to whether the Q outputs of the flip-flops are valid or invalid is made by the processor $1_0$. More specifically, when synchronization requests Sln (n=0, 1, 2, . . . ) from corresponding processors 1n (n=0, 1, 2, . . . ) to the flip-flops $UC_0$–$UCn$ . . . are to be disregarded, the processor $1_0$ sets corresponding $SID_0$–$SIDn$ (n=0, 1, 2, . . . ) to "LOW" level (0). The processor 10, after the termination of a task, generates a trigger signal to the synchronization request $Sl_0$ to set the Q output of the corresponding one of the flip-flops $UC_0$–$UCn$ . . . to "LOW" level (0). Each of the processors 1n (n=0, 1, 2, . . . ) generates a trigger signal to the corresponding one of synchronization request $Sl_0$–$Sln$ . . . to set the corresponding Q output to "LOW" level and the Q output to "HIGH" level to once make the synchronization termination information $Tl_0$–$Tln$ . . . inactive. The outputs of the NAND gates $UA_0$–$UAn$ . . . corresponding to the flip-flops $UC_0$–$UCn$ . . . having the Q outputs set at "HIGH" level (1) go to "HIGH" level for the first time at that time. The output of the multiple input NAND gates $UD_0$ does not change from "HIGH" level to "LOW" level until all of the Q outputs of the flip-flops $UB_0$–$UBn$ . . . corresponding to the flip-flops $UC_0$–$UCn$ . . . having the Q outputs set at "HIGH" level are set to "LOW" level. By the output being at "LOW" level of the multiple input NAND gates $UD_0$, the flip-flops $UB_0$–$UBn$ . . . are preset and the Q outputs thereof return to "HIGH" level. On the other hand, the Q outputs of the flip-flops $UB_0$–$UBn$ . . . return to "LOW" level, and then the active synchronization termination information $Tl_0$–$Tln$ are supplied to the corresponding processors 1n (n=0, 1, 2, . . . ).

If all of the processors are to participate in a synchronous processing, all of the Q outputs of the flip-flops $UC_0$–$UCn$ . . . may be set to "HIGH" level. This is referred to as a simultaneous synchronization mode. If the simultaneous synchronization mode is solely employed, the flip-flops $UC_0$–$UCn$ . . . are not necessary. Alternatively, the Q outputs of the flip-flops $UB_0$–$UBn$ . . . may be logically inverted by invertors and inputted directly to the mutiple input NAND gate $UD_0$.

Next, another embodiment of the synchronous processing circuit of the invention will be explained with reference to FIG. 4. A multi-processor system employed in this embodiment is supposed to comprise m processors. In FIG. 4, a processor 1n and another processor 1n+1 are representatively illustrated. Each of the processors is provided with circuit units 2n, 2n+1 for a synchronous processing among the processors. The units 2n, 2n+1 are equivalent to a circuit portion indicated by 101A in the synchronous processing circuit shown in FIG. 3. The synchronous circuit units 2n, 2n+1 communicate information with each other through signal lines 8. According to this embodiment, processors executing related tasks arbitrarily form a group and can progress processings in synchronism with one another in the group. The above-mentioned circuit units 2n, 2n+1 for establishing synchronization among processors, corresponding to the respective processors, are respectively composed of a synchronous register 5 for storing information related to a group name, a signal line for transmitting the states of flip-flops which are set at a timing of setting a value to the synchronous register 5 or at a later timing, a determination circuit 6 for comparing transmitted information with the contents of the synchronous register 5 and examining whether or not values registered in the synchronous register 5 indicating that the states of processors belonging to a group are all true, and a signal circuit for announcing the examination result to the processors. Reference numeral 4 designates an access signal, 8 a task termination signal line, 9 a status line, and 10 a trigger signal line. The synchronous register 5 corresponds to the flip-flops $UC_0$–$UCn$ . . . in the circuit 101A shown in FIG. 3. In the present embodiment, the synchronous register 5 is provided for each of the corresponding processors, which can thereby independently select processors which are objects for a synchronous processing (in the example shown in FIG. 3, the processor $1_0$ only is authorized to have the selection right.) The present embodiment employs a configuration of distributively providing synchronous processing circuit units for the respective processors, wherein the distributed synchronous processing circuit units 2n (n=0, 1, 2, . . . m) communicate necessary data through the signal lines 8. It is therefore appreciated that a circuit portion including the synchronous processing circuit units 2n (n=0, 1, 2, . . . m) and the signal lines 8 constitutes the synchronous processing circuit 101 shown in FIG. 1.

Next, a synchronization operation sequence in a processor group will be described. Suppose that processors 1n and 1n+1, for example, in the processors $1_0$–$1_m$ form a group and are executing related tasks.

First, the operation of the processor 1n will be mainly explained. The processor 1n, when having terminated a task processing, stores in the synchronous register 5, through a data line 3 (SID$_0$-SIDn-SIDm), a bit sequence (for indicating a processor group) having the nth and (n+1)th bits set to logical "1" and the remaining bits set to logical "0". In a write operation, a signal line 4 for indicating that the processor 1n is accessing the synchronous register 5 generates an active pulse which serves as a clock signal for writing into the synchronous register 5.

Simultaneously, a flip-flop 7 is also triggered by the active pulse on the signal line 4, whereby a task termination signal at logical "0" is delivered at its output terminal Q while a status signal at logical "1" at its output terminal $\overline{Q}$. The task termination signal from the output terminal Q is coupled to the nth line of the signal lines 8 through which it is transmitted to the synchronous processing circuit units 2$_0$-2m of the respective processors. On the other hand, the status signal from the output terminal $\overline{Q}$ is supplied to a TEST input terminal of the processor in through the status line 9. The processor In interrupts its processing until the status signal at the TEST input terminal becomes "0" level. Values stored in the synchronous register 5 and those on the signal lines 8, which maintain a correlation with each other from 0 to m, are supplied to the determination circuit 6. In this embodiment, when all values of the task termination signal lines 8 corresponding to bits of the synchronous register 5 set to logical "1" become logical "0" by the action of a NAND-NAND gate (corresponding to the NAND gates UA$_0$-UAn . . . and the multiple input NAND gate UD$_0$ in the synchronous processing circuit 101A), or when the nth and (n+1)th lines of the task signal termination signal lines 8 become logical "0", a trigger signal 10 becomes active or logical "0". The flip-flop 7, in response to the active trigger signal 10, is preset, whereby the task termination signal 1 from the terminal Q and accordingly the nth line of the task termination signal lines 8 become logical "1", causing the trigger signal 10 to become logical "1". Simultaneously, the status signal at the terminal $\overline{Q}$ becomes logical "0", causing the TEST input terminal of the processor in to also become logical "0", whereby the processor in resumes so far interrupted processing. The same operation is performed also in the processor n+1, so that the processors 1n and 1n+1 are synchronized with each other, as the result, at the time both of them have terminated task processings thereof. As described above, the flip-flop 7 disposed in each of synchronous processing circuit units, in spite of its simple structure, can control all of the task termination output, status output and processing resumption output.

The above-mentioned is the operation sequence performed by the synchronous processing circuit of the invention. In this invention, the synchronous processing performed by software is only a writing of values into the synchronous register 5 which merely requires a processing time of approximately one machine instruction on the machine language basis. The rest of processing is all performed by hardware, so that overhead required for the synchronous processing is minimized under the condition that such processing is programmable.

Further according to the invention, it is possible to group related processors only by utilizing a set of the synchronous processing circuit 101, which facilitates the synchronous processing for processors belonging to respective groups. Also, the provision of plural sets of the synchronous processing circuits 101 allows multiplexed synchronous processing among the groups. The division of the processors into groups and the multiple synchronization provide flexibility in the parallel processing, thereby making it possible to achieve a highly efficient parallel processing close to a data flow on a general-purpose multi-processor system.

Figure 4:
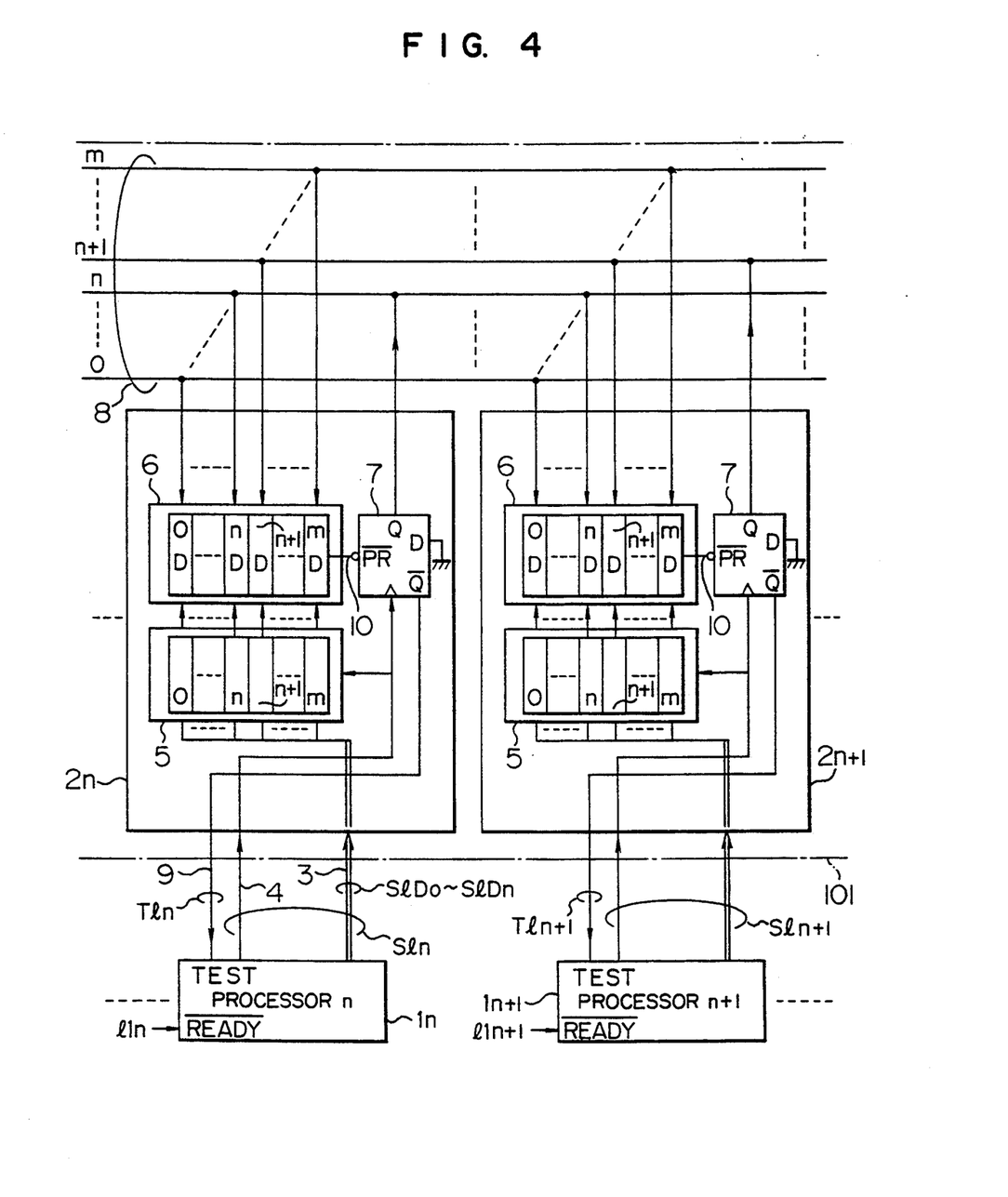
FIG. 4 is a schematic circuit diagram illustrating another embodiment of the synchronous processing circuit shown in FIG. 1.
Figure 5:
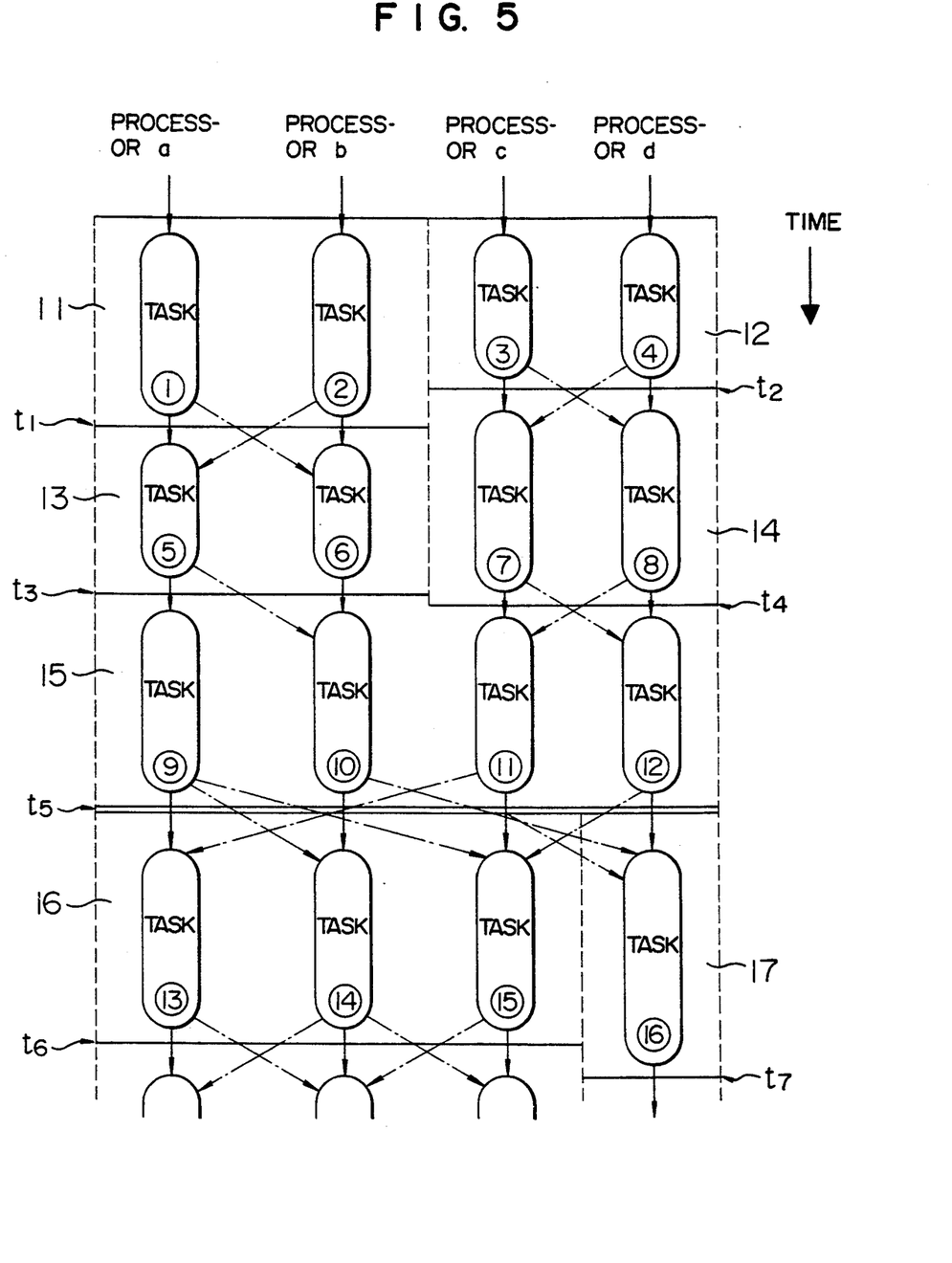
FIG. 5 is an explanatory diagram illustrating an example of a control for a parallel processing executed by the synchronous apparatus for processors according to the invention.

FIG. 5 illustrates the flow of a parallel processing controlled by the synchronous processing circuit 101. The example shown in FIG. 5 does not employ the local synchronous processing performed in the signal control circuit 50n, so that the sycnhronous processing is supposed to be executed by checking the synchronization termination information generated from the synchronous processing circuit 101 by the processor 1n. It is also assumed in FIG. 5 that a parallel processing performed by four processors a-d is controlled by the synchronous processing circuit 101 of the invention from the upper part to the lower part of the drawing with the lapse of time. First, tasks ①  and ②, which are related to each other, are being processed by the processors a and b, respectively, while tasks ③ and ④ are likewise being processed by the processors c and d. Since processors executing related tasks can be collected as a group, the processors a and b forms a group 11, and the processors c and d a group 12. Each of solid arrows connecting between respective two tasks indicates a flow of processing and data in a single processor. One-dot chain arrows each indicates a flow of data between tasks respectively executed by one and the other processors in a group, that is, communications between processors in a group. At each of times $t_1$ and $t_2$, communications are needed in each of the two groups, a synchronous processing is executed by the synchronous processing circuit 101, and then processed data is exchanged between the processors in each of the groups. Thereafter, the group formed of the processors a and b proceeds to the processing of tasks ⑤ and ⑥, while the groups formed of the processors c and d proceeds to the processing of tasks ⑦ and ⑧. Thus, the synchronous processing performed by the synchronous processing circuit 101 for processors shown in FIG. 4 indicates with which processors each of groups was formed and how the task processing so far has been executed. The grouping of the processors does not give rise to data communications between different groups, so that each group can progress its processing independently of one another. Since the progress of the parallel processing is flexibly controlled, an efficient parallel processing can be achieved. Thereafter, groups 13 and 14 are formed of the same processors as those forming the groups 11 and 12, respectively, for executing other task processings. At times, $t_3$ and $t_4$, a synchronous processing is performed for communicating data between processors in each group. At a time $t_5$, all of tasks ⑨- 12 are related to one another and therefore independence between the groups disappears, so that after a synchronous processing has been performed in each of the groups, another synchronous processing is again performed by the synchronous processing circuit 101 for processors in the different group to synchronize all of the processors. In other words, it can be thought that the synchronous processing has been performed by the synchronous processing circuit 101 for processors in the different group for synchronizing the two groups, which consequently results in forming a group 15 including all of the processors. Afterward, the processors a-c which are to process related tasks 13 - 15 form a group 16, while the processor d which is to process an independent task 16 separately forms a group 17. In this manner, the processors a-d, re-forming groups, execute the parallel processing while performing the synchronous processing at each of times $t_6$ and $t_7$. By thus performing multiplexed synchronous processing by plural sets of the synchronous processing circuits 101, re-formation of groups can be readily carried out, which results in achieving a more flexible and highly efficient parallel processing.

Figure 1:
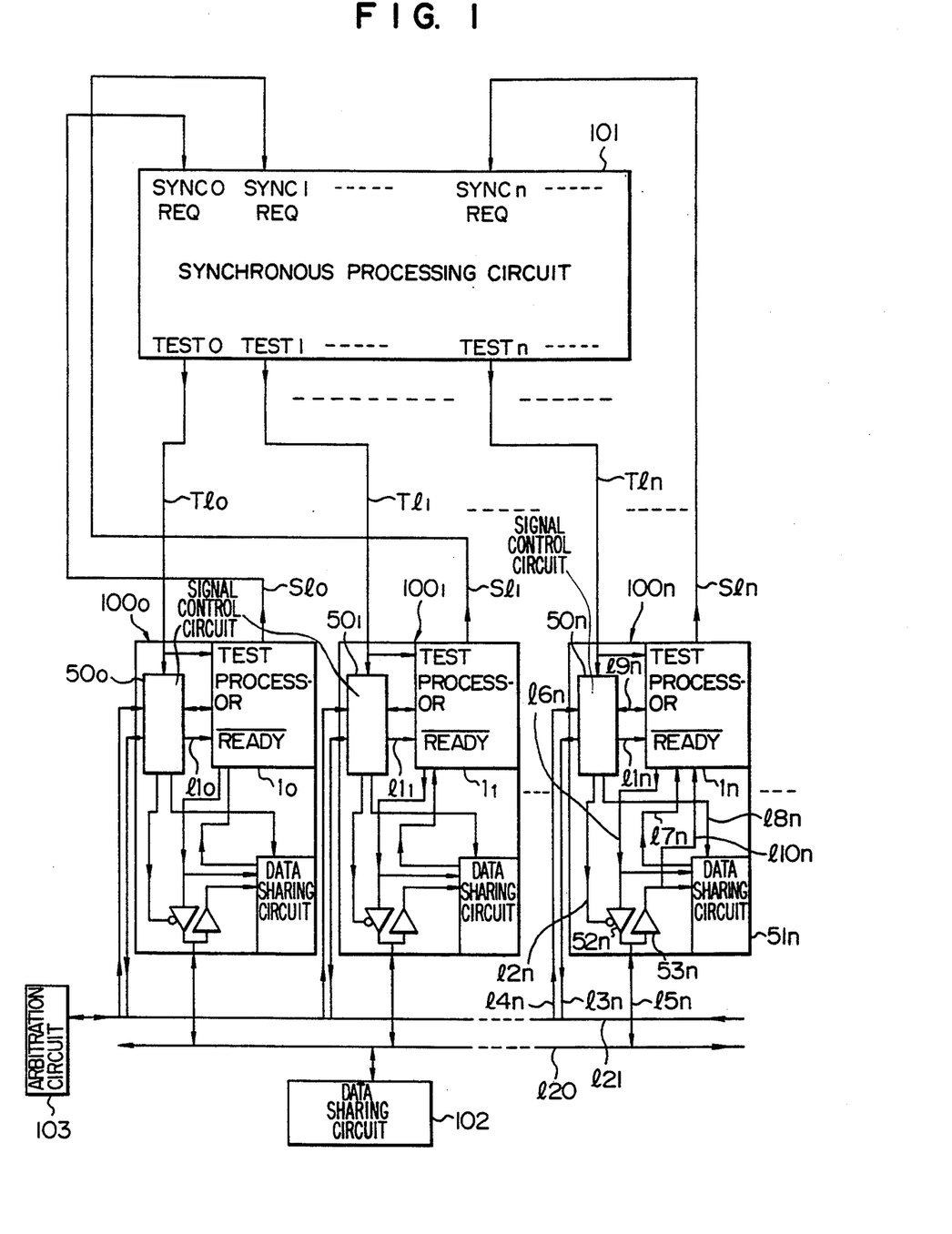
FIG. 1 is a hardware block diagram illustrating the whole arrangement of an embodiment according to the invention.
Figure 6:
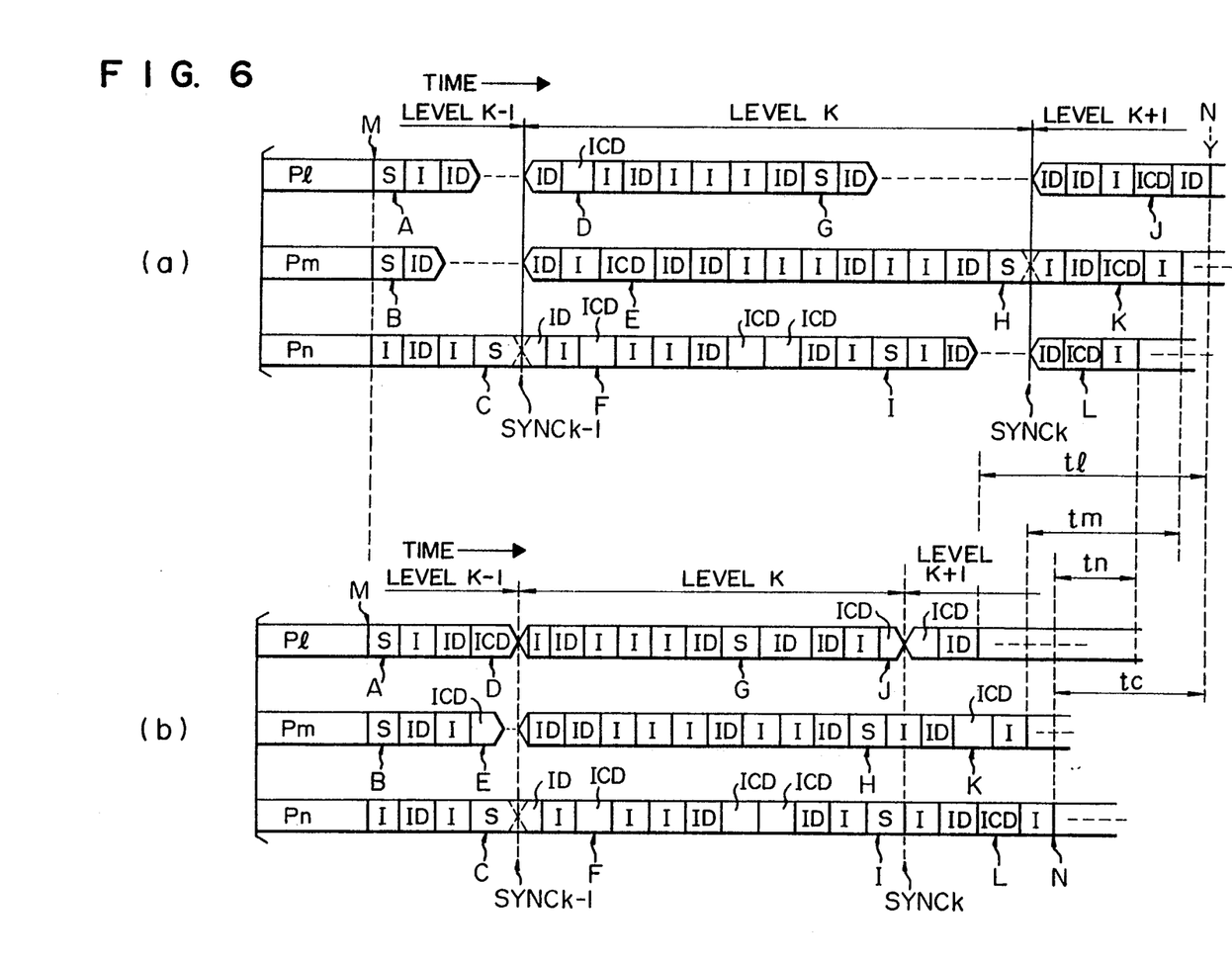
FIG. 6 is an explanatory diagram illustrating how a processing time is reduced by employing a local synchronization circuit in combination.

FIGS. 6 depicts specific effects produced by the synchronous processing apparatus for processors shown in FIG. 1 formed with the synchronous processing circuits of the invention shown in FIG. 4. In the drawing of FIG. 6, an analysis is carried out by breaking up a parallel processing into instructions of the processor which are minimum units constituting a task. FIG. 6(a) illustrates a case where a parallel processing is performed among processors only depending on the synchronization termination information Tln without employing the local synchronization method. In other words, it can be thought that a part of the parallel processing flow shown in FIG. 5 is cut out. Operating conditions and assumptions of FIG. 6(a) will be defined as follows:

1) An inter-processor synchronization instruction for the processor to output the task termination information to the synchronous processing circuit 101 and declare the termination of a task is designated by reference "S".

2) Processors Pl, Pm and Pn form a group and execute related tasks while establishing synchronization in the group.

3) Each of the processors Pl, Pm and Pn, after having executed the instruction S, is unconditionally kept waiting until the synchronization termination information (TEST output) from the synchronous processing circuit 101 becomes active (until all of the processors Pl, Pm and Pn have terminated their tasks at a current level and respectively execute the instruction S.)

4) Even if the synchronization termination information is in the inactive state, each of the processors can limitatively execute as many instructions as possible, which instructions exist in an instruction queue and an instruction cache inside thereof, as long as external data is not used for such an execution. More specifically, for an external bus cycle generated for access to the synchronous processing circuit when the instruction S is to be executed, a synchronizing logic is configured such that the active Ready signal is prohibited from returning to the processor until the synchronization termination information becomes active so as to forcibly interrupt the external bus cycle (the external bus cycle for access to the synchronous processing circuit is prohibited from terminating), and the internal processing of the processor doesn't stop, i.e., the processor can execute its internal processing as possible.

5) An instruction which does not use external data (for example, an operation between registers and so on) is designated by "I". On the other hand, an instruction which uses external data other than data on a sharing system CSYS is designated by "ID", and that using shared data on the sharing system by "ICD".

FIG. 6(b) illustrates a case where a local synchronization method is employed to forwardly progress subsequent task processings until the sharing system is first accessed by an instruction ICD. The above-mentioned conditions and assumptions 1), 2) and 5) defined for FIG. 6(a) are also applied to FIG. 6(b), while the conditions 3) and 4) in FIG. 6(a) are respectively replaced by the following conditions 6) and 7) in FIG. 6(b):

6) Each of the processors Pl, Pm and Pn, after having executed an instruction S and delivered the active task termination information to the synchronous processing circuit, forwardly progresses a task processing at the next level until a sharing system access instruction (ICD) is newly issued.

7) At the time each of the processor Pl, Pm and Pn, forwardly processing the task forwardly at the next level under the condition 6), is to execute the sharing system access instruction (ICD) for the first time, if the synchronization termination information has not become active, the active Ready signal 19 generated by the ICD for an external bus cycle is prohibited from returning to the processor until the synchronization termination information becomes active. In other words, the external bus cycle generated by the ICD is forcibly interrupted (the bus cycle is prohibited from terminating) until the synchronization termination information becomes active. Incidentally, the instruction I on an instruction queue or on an instruction cache can be forwardly progressed if executable. The synchronous processing performed by an instruction ICD and the synchronization termination information is referred to as the "local synchronous processing", as described above.

In FIG. 6, reference SYNCK indicates a time at which the active synchronization termination information returns from the synchronous processing circuit, that is, synchronization is established at a level k. In FIG. 6(a), empty times are produced in the processors Pl and Pm in the latter half of a level k−1 and in the processors Pl and Pn in the latter half of the level k. In these empty times, the processors remains inactive (execute inoperative processing). In FIG. 6(b), since each of the processors can progress its processing until an instruction ICD appears, no empty time is produced in both of the levels k−1 and k except for a short empty time in the processor Pm in the latter half of the level k−1. Assuming that the start point is M and the end point is N, the processor Pl reduces its processing time by tl, the processor Pm by tm, and the processor Pn by tn, comparing the case shown in FIG. 6(b) with that in FIG. 6(a). The processor which executes the critical path of the parallel processing is the processor Pn at the level k−1, Pm at the level k and Pl at the level k+1 in FIG. 6(a), whereas it is the processor Pn at all of the levels k−1, k and k+1 in FIG. 6(b). It will be appreciated from these drawings that the critical path itself has changed. Such a change in the critical path is caused by the fact that each of the processors forwardly processed tasks at two or more levels, which leads to dynamically changing the substantial task processing time. As the result, a whole processing time needed for the parallel processing shown in FIG. 6, from the processing start time M to the end time N, is reduced by tc, in comparison of FIG. 6(b) with FIG. 6(a). Such a reduction in time is equal to an improvement of the processing ability by approximately 21%. It will therefore be appreciated that the local synchronization method can largely improve the processing ability of the multi-processor system.

Incidentally, in FIG. 6(a) and (b), points A, B and C indicate the positions at which the synchronization instructions S executed by the processors Pl, Pm and Pn appear at the lever k−1, respectively. Also, points D, E and F indicate the positions at which appear the instructions ICD of the processors Pl, Pm and Pn each accompanying a sharing system access which are executed for the first time in a task executed at the level k. Similarly, points G, H and I are the positions of the instructions S at the level k, and points J, K and L the positions at which the instructions ICD appear for the first time in tasks executed at the level k+1.

As described above, the present embodiment can remove fixed borders between tasks which are defined in for example FIG. 5 as levels for synchronizations and forwardly progress as many task processings as possible until a need arises to access the sharing system for the first time to communicate shared data in a task processing, thereby making it possible to reduce an empty processing time (inactive time of the processors) caused by a waiting processing among the processors in a synchronous processing. This leads to dynamically changing a task processing time in accordance with synchronization conditions of the respective processors to reduce the critical path itself of a parallel processing, thereby producing similar effects to those of a data driven system and enabling the execution of a more efficient parallel processing.

For dividing a fixed job into tasks and paralelly processing these tasks in a general-purpose multi-processor system, the synchronous processing circuit of the present embodiment groups arbitrary processors executing related tasks and employs a synchronous processing method for establishing synchronization among processors belonging to the same group or among groups, whereby a synchronizing mechanism for the processors can be implemented by hardware to such a region that numerous parallel processing flows could be programmed by software using functions of the synchronizing mechanism, so that software overhead required for the synchronous processing is minimized.

Figure 7:
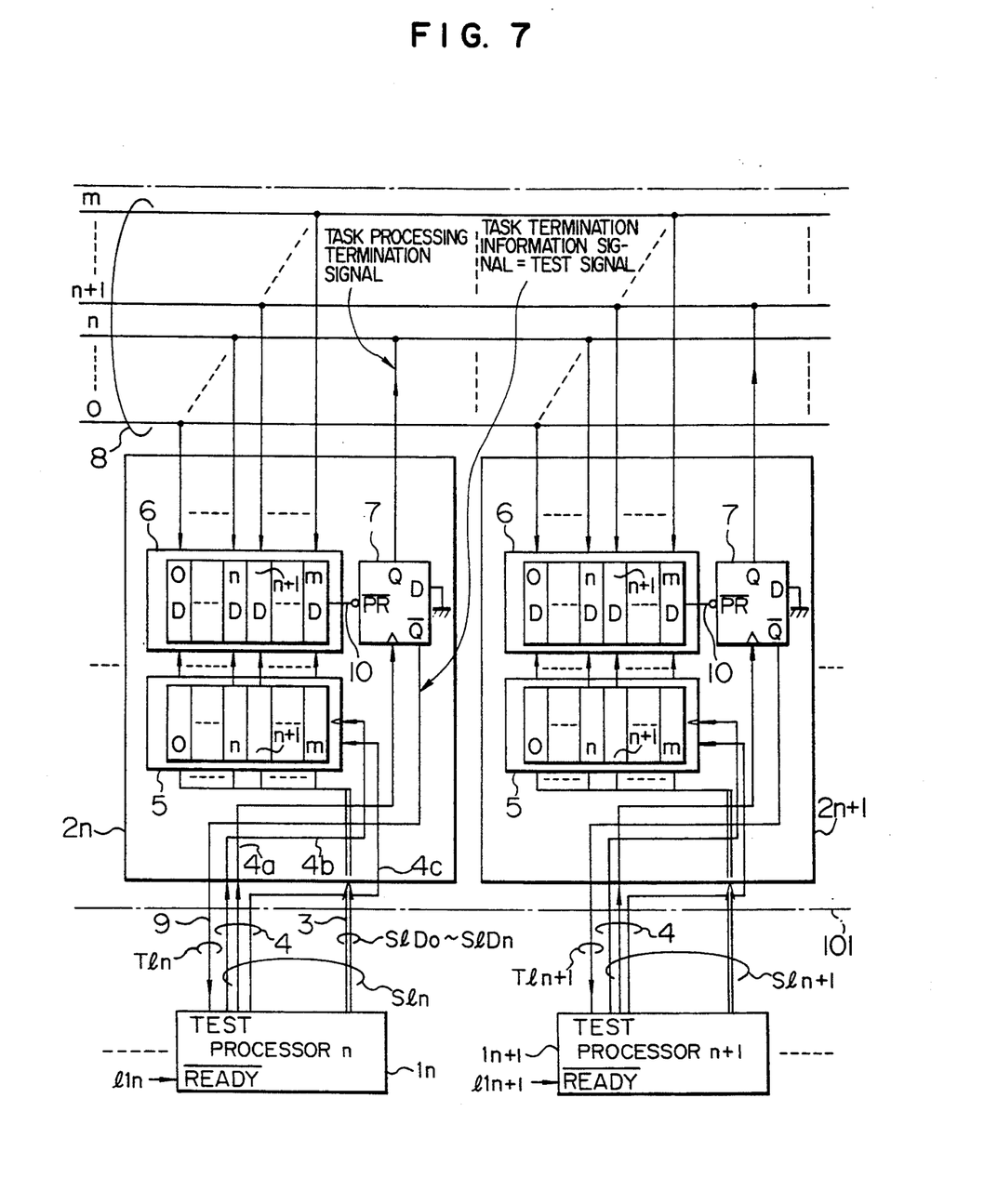
FIG. 7 is a schematic circuit diagram illustrating another embodiment of a synchronous processing circuit of the invention.
Figure 8:
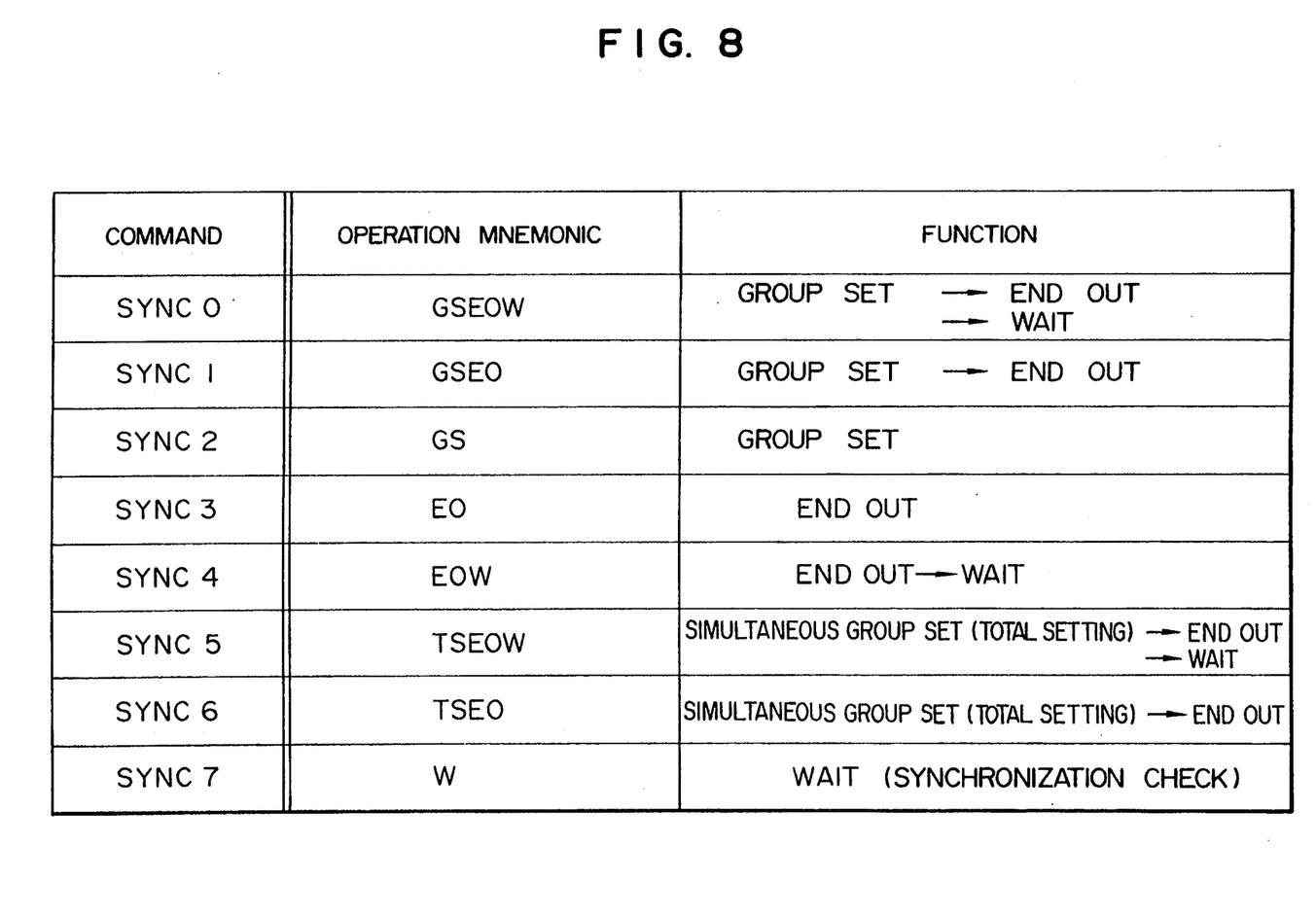
FIG. 8 is a table showing an example of instruction sets for a synchronous processing system for processors.

Next, FIG. 8 shows an example of instruction sets for a synchronous processing system for processors to realize a reduction of inoperative processing time of processors in software during a parallel processing by means of a control flow. A basic softwared control flow may be formed by using the synchronous processing circuit shown in FIG. 4, however, for a higher performance, control lines 4 composed of separate lines 4a, 4b and 4c each having a particular function as shown in FIG. 7 is employed. The line 4a transmits a signal for triggering a flip-flop 7 for outputting task termination information, and the line 4b a trigger signal for registering information showing a group of processors to be synchronized in a synchronous register 5. The line 4c will be described later.

The contents of FIG. 8 will be next described. For operating the synchronous processing system for processors shown in FIG. 7, each of the processors n (n=0, 1, ...) can designate a total of eight instructions SYNC-0–SYNC7 for correspodning synchronous processing elements n (n=0, 1, ... ). Respective instructions are provided with mnemonics which express their functions. Basic functions of the respective instructions are as follows:

GS ... Group Setting (registers group information in a synchronous register 5 to indicate processors which constitute the group.)

EO ... End Out (makes the task termination information active and outputting the active information onto a task processing termination signal line to indicate the termination of a task.)

W ... Wait (keeps processors in a group in a waiting state until all the processors belonging to the same group have terminated respective tasks. This is a function for finally examining whether a synchronous processing has been terminated.)

The above-mentioned basic functions may be combined to form the following complex instructions which can be each executed as a single machine instructions:

GSEOW ... sequentially processes the respective functions in the order of Group Setting (GS), End Out (EO) and Wait (W), thus executing a sequence of a synchronous processing by a single machine instruction.

GSEO ... sequentially processes the respective functions in the order of Group Setting (GS) and End Out (EO).

EOW ... sequentially processes the respective functions in the order of End Out (EO) and Wait (W). A sequence of the synchronous processing is executed in the form of a single machine instruction for a group previously set by the GS function.

Besides, there are the following complex instructions for providing higher speed and simplified processing executed by the processor side:

TSEOW ... sequentially processes the respective instructions in the order of Total Setting (TS), End Out (EO) and Wait (W).

TSEO ... sequentially processes the respective instructions in the order of Total Setting (TS) and End Out (EO).

TS in the above complex instructions, called "Total Setting", designates a basic function for instructing a synchronous processing for all the processors as a group. This is a function for setting the value of the synchronous register to a state in which all the processors are assumed to belong to a single group by making the signal line 4C shown in FIG. 7 active.

Figure 9A:
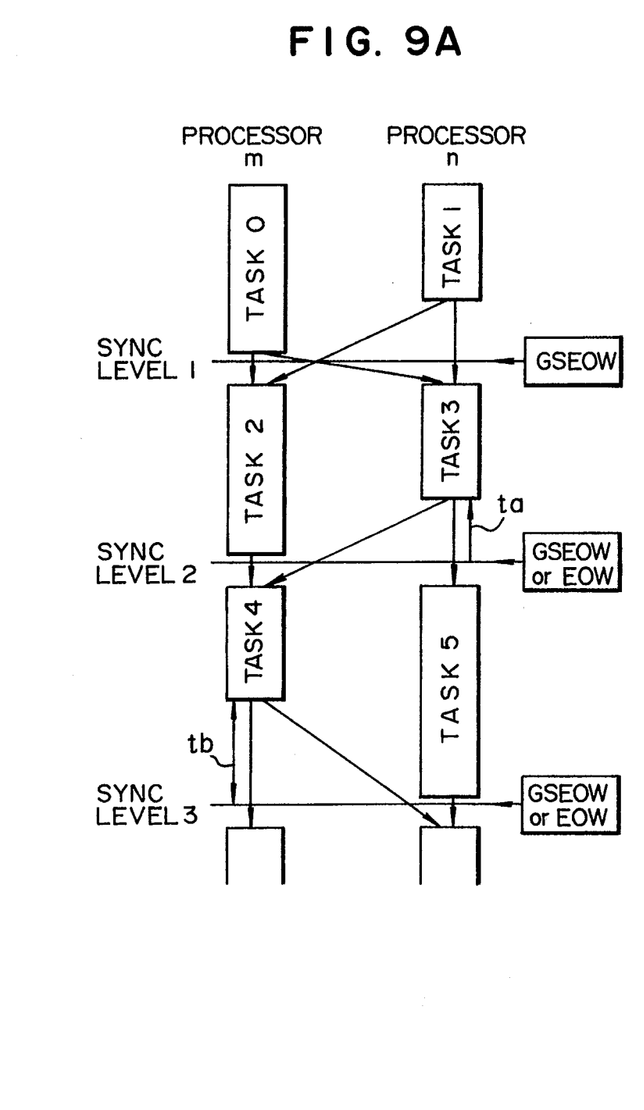
FIGS. 9A and 9B are explanatory diagrams illustrating how a processing time reduction effect is produced by using a control flow.
Figure 9B:
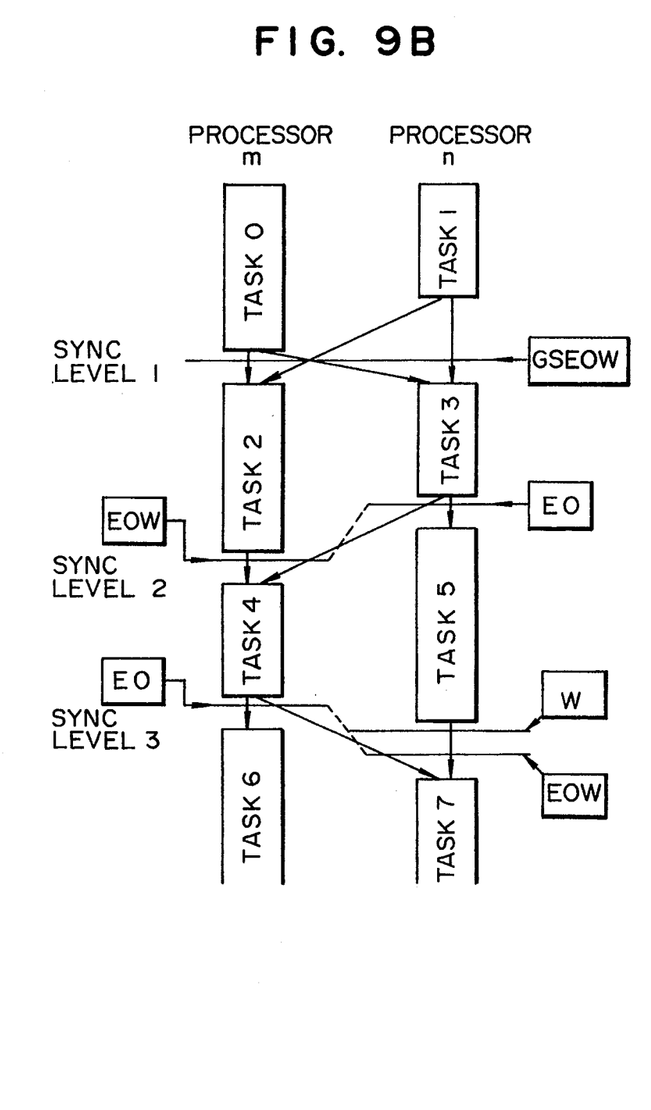

The use and effect of the complex instructions will be next described, compared with a conventional control flow, with reference to FIGS. 9A and 9B.

FIG. 9A shows a parallel processing control by means of a conventional synchronous processing which is performed by using the synchronous processing system for processors shown in FIG. 7. In the drawing, processors m and n constitute a group. As has been previously described, the processors m and n declare to each other that they belong to the same group at the time when both of the processors respectively have terminated their tasks. Then, until both task processing termination signals outputted at that time from the processors m and n in the group become active, the processor m waits for the processor n, or vice versa. When both the task processing termination signals corresponding to processors m and n have become active to finish the synchronous processing between processors m and n, the processors m and n can progress the processing to the next tasks, whereby the parallel processing is advanced without contradiction.

FIG. 9B shows an example of a control flow (which controls the parallel processing in a top-down manner by software synchronous instructions) which separately employs an EO instruction (for outputting only task termination information) and a W instruction (for examining whether or not the task termination information signal 9 (TEST signal) corresponding to a processor have been ready and waiting until the task termination information signal 9 becomes ready) to thereby accomplish an effect similar to that produced by an auto-tuning function using a data-driven (data flow type) performed in accordance with the access condition for accessing to the shared common system CSYS, as has been described with the embodiment shown in FIG. 1. Previously, a compiler inserts an appropriate synchronizing instruction selected from SYNC0–SYNC7 shown in FIG. 8 at points in a program where the parallel processing in the level is completed and the synchronous processing is to be performed. The synchronizing instructions SYNC0–SYNC7 are properly used under the following conditions:

(1) At the time one processor has terminated a task, if there is no relation from a task executed by the other processor which will terminate the execution at the same level to a task which is to be next executed by the one processor, an EO instruction for only outputting the active task termination information is inserted. More specifically, in the examples shown FIGS. 9A and 9B, this condition is satisfied at the times of terminating tasks 3 and 4. Explaining the processing from the view point of the processor operation, if a processor, when progressing the processing to the next task after having terminated a task, does not require information from the other processor which executes a task at the same level, the EO instruction is executed to unconditionally progress the processing to the next task.

(2) When a task to be next executed by one processor after the presently executed task has been terminated has a relation with a task executed by the other processor which is to be terminated at the same level as the presently executed task, a processor which has executed the EO instruction at the preceding synchronization level to proceed to a task processing currently under execution executes the W instruction as a synchronization checking instruction corresponding to the EO instruction executed at the preceding level to confirm whether or not the synchronous processing at the preceding level has been terminated. Then, the synchronous processing at the present level (for example, GSEOW or EOW) is executed to progress the processing to the next task. More specifically, in the examples shown in FIGS. 9A and 9B, this condition is satisfied at the time when a task 5 has been terminated. On a program, the W and EOW instructions may be inserted in this order at the time of the termination of the task 5.

The synchronization level mentioned here corresponds to SYNC levels 1–3 shown in FIGS. 9A and 9B and refers to a time when the task processing has been terminated and the execution of the synchronous processing is required. Incidentally, the difference between the GSEOW instruction and the EOW instruction lies in that the former includes a function (GS) for setting us a group register 5 with information of a group composed of processors to be synchronized, while the does not include such a function. Therefore, when the EOW instruction is designated, a processor group configuration set by the previous GS function is used as it is as a default value.

Next, the sequence of the processing shown in FIG. 9B will be described.

(a) It is assumed that tasks 0, 2, 4 and 6 are executed by the processor m in this order, while tasks 1, 3, 5 and 7 by the processor n in this order. In this example, it is also assumed that there are relations between the respective tasks indicated by arrows in the drawing.

(b) The processing results of the taks 0 and 1 are commonly used by the tasks 2 and 3. It is therefore necessary to establish synchronization between the processors m and n at SYNC level 1. A sequence of the synchronous processing from the group setting to the synchronization establishment check is accomplished by a single instruction, that is, the GSEOW instruction executed by both of the processors m and n.

(c) At SYNC level 2, the task 4 uses the processing results of the tasks 2 and 3, while the task 5 only uses the processing result of the task 3. However, there is no change of group. Therefore, the processor m executes the EOW instruction to perform a sequence of the synchronous processing from the output of the task termination information to the synchronization establishment check. Meanwhile, the processor n executes the EO instruction to immediately proceed to the next processing without performing the synchronization check (W function).

(d) At SYNC level 3, the task 6 requires the processing result of only the task 4 while the task 7 requires the processing results of both of the tasks 4 and 5. Therefore, the processor m executes the EO instruction to immediately proceed to the next processing without performing the synchronization check (W function). On the other hand, the processor n executes the W instruction corresponding to the EO instruction executed previously (at SYNC level 2) to perform the synchronization check at SYNC level 2, and next executes the EOW instruction to progress the processing to the next task (the task 7) after executing a sequence of the synchronous processing at SYNC level 3 (in other words, confirming that the task 4 has been completed).

It can be seen that inoperative times ta and tb produced in FIG. 9A are almost eliminated in FIG. 9B by the operations described above.

The characteristics of the control flow method according to the present embodiment will be described as follows:

(1) When a relation between tasks and a processing time of said each task have been precisely known, an optimum tuning for eliminating inoperative time can be accomplished only by inserting an appropriate synchronization instruction in a program according to rules at the time of a previous paralleling schedule. An automatic tuning, if employed in this case, cannot strictly judge the relation between tasks, so that it provides an optimum tuning inferior to the present embodiment.

(2) Since no special hardware is required except for the synchronous processing system shown in FIG. 7, the control flow can be realized at a low cost.

On the other hand, the control flow method of the embodiment is disadvantageous over the auto-tuning method shown in FIG. 1 in the following points:

(1) If a task processing time is not precisely known, it is not ensured that the basic paralleling schedule itself provides an optimum paralleling efficiency. Particularly, a high efficiency cannot be expected for a processing in which a task processing time dynamically changes.

(2) Since the synchronous processing function is separately used (for example, it is separated into the EO and W instructions), synchronous processing overhead is slightly increased.

It is possible to minimize inoperative processing times of the processors and provide a more effective optimum parallel processing by combining the control flow of the present embodiment with a data flow type auto-tuning in the form of hardware utilizing the aforementioned access condition for accessing to the share common system CSYS.

According to the invention, the synchronous apparatus for processors is provided with a plurality of processors for sharing a plurality of tasks and parallelly processing the shared tasks, a data sharing circuit for sharing data communicated among the processors, a synchronous processing circuit for establishing synchronization among the plurality of processors, and a local synchronization circuit for controlling contending access requests from each of the plurality of processors for accessing the data sharing circuit, wherein when a task processing has been terminated with a synchronous processing under way, each of the processors can forwardly progress the next task processing as many time as possible until shared data is needed in the next task, thereby producing an effect of reducing an empty processing time.

Also, for processing jobs in parallel, related processors are grouped, an the processors belonging to the same group or groups are synchronized with one another, whereby a synchronous processing mechanism can be implemented by hardware, producing an effect of minimizing software overhead required for a synchronous processing.

I claim:

1. A synchronous apparatus for processors comprising:
   a plurality of processors for sharing a plurality of tasks and parallelly processing shared tasks;
   a data sharing circuit for holding shared data which is shared by said plurality of processors;
   a synchronous processing circuit for generating, when processors of said plurality of processors belonging to a predetermined group in which synchronization should be established have terminated all task processings, a status signal indicative of the termination of all task processings in said predetermined group; and
   a local synchronization circuit provided for each of said processors, and coupled to said synchronous processing circuit and said data sharing circuit, for monitoring an accessing operation to said shared data by an associated processor corresponding to the local synchronization circuit and allowing the associated processor in said predetermined group which has terminated task processing before generation of said status signal to execute a next task until said associated processor executing said next task requires an accessing of said shared data in said data sharing circuit, and when said associated processor issues a request of said accessing of said shared data before said status signal becomes active, said local synchronization circuit corresponding to said associated processor causes the accessing operation to be suspended and stopped automatically until said status signal becomes active, and said pending accessing operation to be restarted after said status signal becomes active.

2. A synchronous apparatus according to claim 1, wherein said local synchronization circuit for each processor in said predetermined group comprises:
   a detecting means for detecting an access request signal issued from an associated processor to said data sharing circuit; and
   a logic means for operating a logical OR circuit of an active low output of said detecting means and an active low output of said status signal to generate an active low output of said logical OR circuit as a ready signal for allowing termination of the accessing operation by said associated processor on an active state of the ready signal, and for extending termination of the accessing operation when said status signal has not been generated whereas said access request signal has been generated.

3. A synchronous apparatus according to claim 1, wherein said synchronous processing circuit comprises for each of said processors:
   a synchronous register for storing bit information outputted from an associated processor associated with the synchronous register, said bit information indicating designations corresponding to processors in said predetermined group to which said associated processor belongs;
   a canceling means for canceling a designation in said bit information corresponding to an arbitrary processor in said predetermined group when said arbitrary processor has terminated a related task processing;
   a termination detecting means coupled to said canceling means for detecting, on a basis of a state of said bit information, that all processors in said predetermined group have terminated task processings when all of said bit information corresponding to said group are cancelled;
   a means responsive to a signal from said termination detecting means indicating that all processors in said predetermined group have terminated task processings, for supplying a synchronization termination signal to said associated processor; and
   a means responsive to said signal from said termination detecting means indicating that all processors in said predetermined group have terminated task processings, for restoring said synchronous register to an initial state.

4. A synchronous apparatus according to claim 3, wherein said synchronous processing circuit includes a single flip-flop means for each of said processors, each of said flip-flop means comprising:
   a trigger clock input terminal to be triggered responsive to a storing operation for storing said bit information to said synchronous register to be triggered;
   an input terminal for inputting said signal from said termination detecting means, said signal indicating that all processors in said predetermined group have terminated task processings;
   a first output terminal responsive to a trigger to said trigger clock input terminal to generate an output for canceling a designation in said bit information stored in said synchronous register corresponding to said associated processor, and responsive to a signal inputted to said input terminal to restore said bit information in said synchronous register to said initial state; and a second output terminal responsive to said signal from said termination detecting means to output said synchronization termination signal to said associated processor.

5. A synchronous apparatus as claimed in claim 1, wherein said data sharing circuit includes a shared memory means.

6. A synchronous apparatus as claimed in claim 1, further comprising:

means for resetting said status signal.

* * * * *